May 25, 1937.  D. R. YARNALL  2,081,522
VALVE CONSTRUCTION
Original Filed Aug. 5, 1935  2 Sheets-Sheet 2
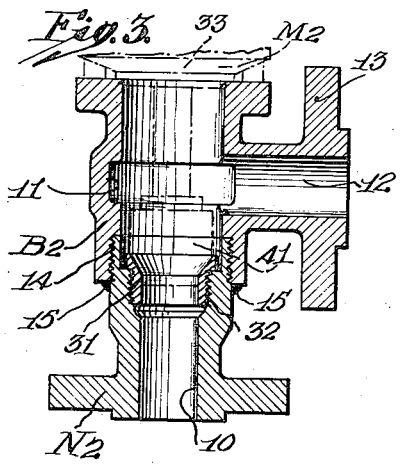
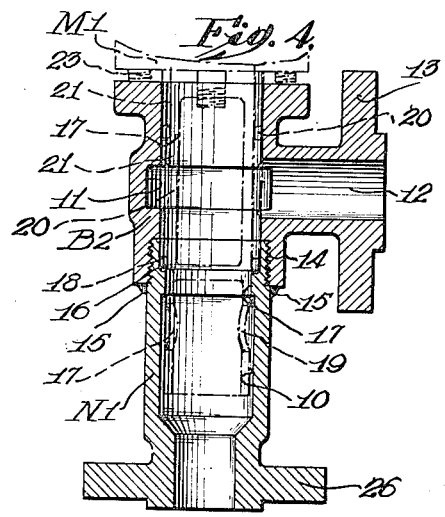
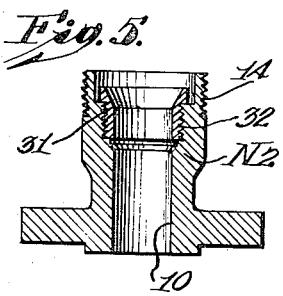
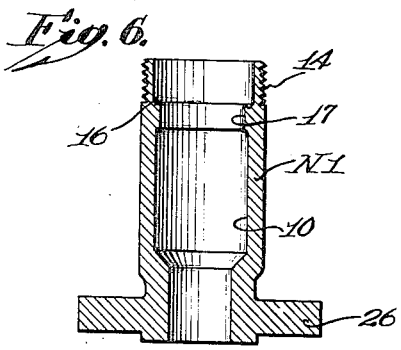
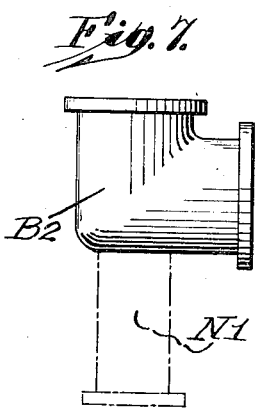
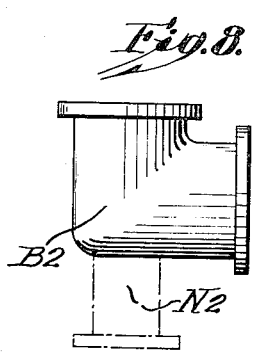
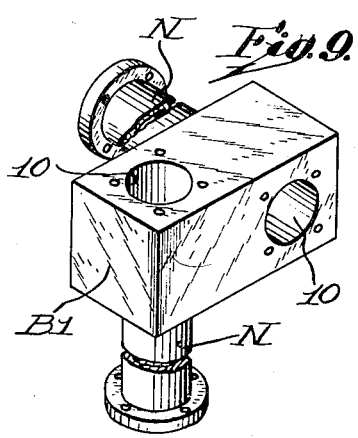
Inventor
David Robert Yarnall Patented May 25, 1937

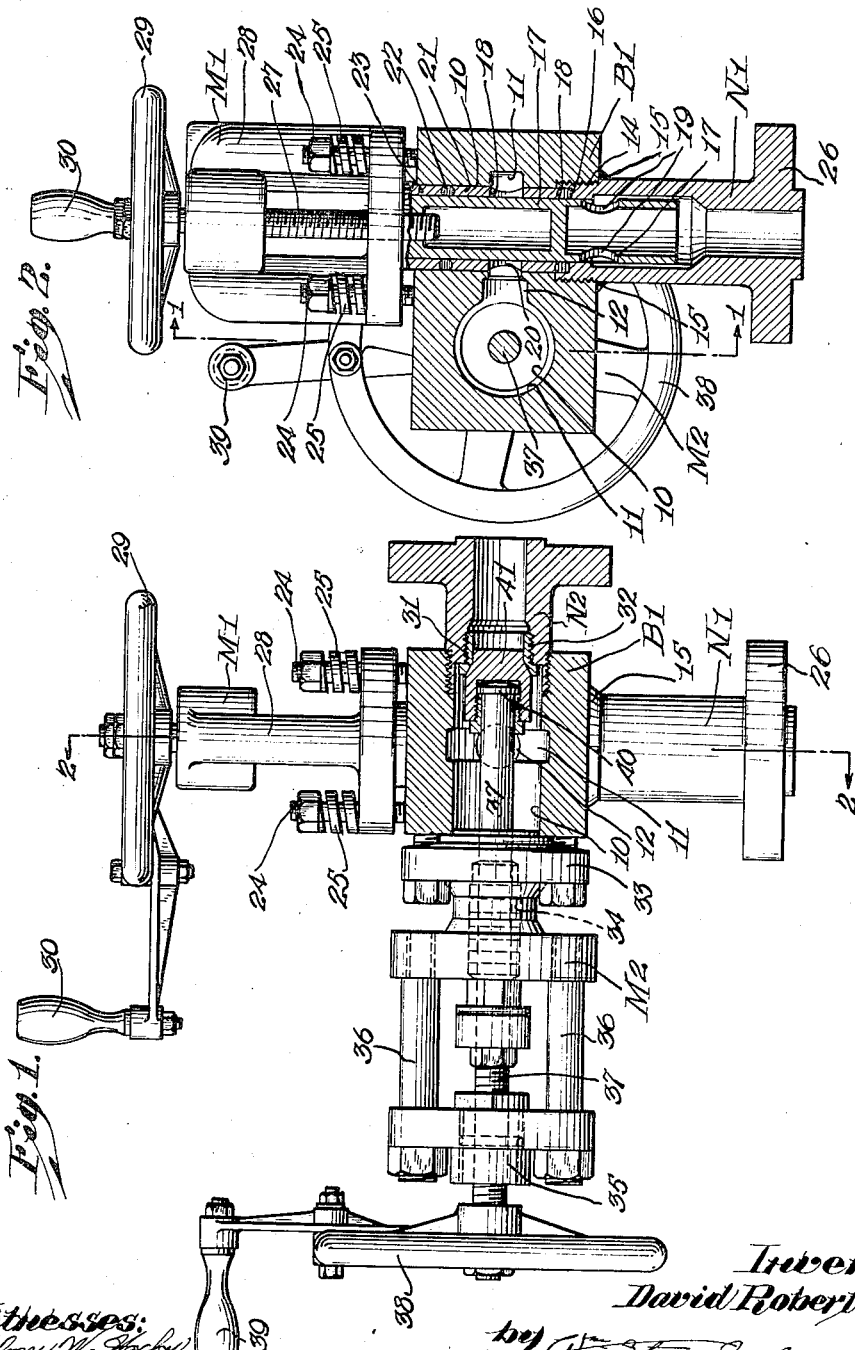

2,081,522

UNITED STATES PATENT OFFICE 2,081,522

VALVE CONSTRUCTION

David Robert Yarnall, Philadelphia, Pa., assignor to Yarnall-Waring Company, Philadelphia, Pa., a corporation of Pennsylvania Application August 5, 1935, Serial No. 34,662
Renewed March 19, 1937

8 Claims. (Cl. 277—67)

The present invention relates to valves of selectively different types and more particularly to the manufacture thereof.

A purpose of the invention is to cheapen and simplify the manufacture of different types of valves by providing an interchange relation for special parts characteristic of different types of valves, permitting an easy selective interchangeability of type with the same valve body by associating therewith selectively different interchange auxiliary members to suit the purchaser's order.

A further purpose is to associate a valve body with selectively different interchange members according to the type of valve desired.

A further purpose is to manufacture parts of valves that are recurrent in different types of valve, as separate units, variantly assembling interchange units to vary the type of valve.

A further purpose is to adapt a valve body having a through bore intermediately enlarged and ported, to have at one end of the bore an interchange connection respectively with a nozzle carrying a disk valve seat at its connection end and a nozzle mounting packing for a seatless valve, and at the other end of the bore an interchange connection respectively with a seating valve and a seatless valve.

A further purpose is to mount one of the packing rings of a seatless valve upon the inner end of a nozzle non-integral with the body of the valve.

A further purpose is to produce a desirable tandem combination of a seatless and a hard-seat valve in the same valve body, desirably making the axes of the movable members of the valves respectively transverse.

Further purposes appear in the specification and in the claims.

The invention involves both the apparatus and the process.

I have elected to illustrate my invention by valve structure which is assembled from units of manufacture variantly connected into different types of valve, showing each valve part as two interchange units, each unit characteristic of one or more types of valve.

Figures 1 and 2 are sections upon the line 1—1 of Figure 2 and the line 2—2 of Figure 1, and they show a tandem hard-seat disc valve and seatless valve manufactured in accord with my invention from interchangeable units.

Figures 3 and 4 show in section a different valve body unit from that of Figures 1 and 2 assembled with respectively different nozzle units to form respectively a single hard-seat type valve and a single seatless type valve.

Figures 5 and 6 are interchange units, shown assembled with the same valve body respectively in Figures 3 and 4.

Figures 7 and 8 show in elevation a valve body, having an interior generally as in Figures 3 and 4, and with dot-and-dash line indication of different interchange nozzles, respectively as shown in section in Figures 4 and 3.

Figure 9 is a perspective view of a body for a tandem valve, intended to be of variant type according to the selectively variant units assembled with the body, and suitably having a hollow interior, substantially as that illustrated in Figures 1 and 2.

Like numerals refer to like parts in all figures.

Where valves for high pressure steam are concerned, the valve body is almost universally an expensive forging. In the past it has been customary to forge the entire valve casing and the manufacturer has been put to great cost to stock forged casings for the various sizes of valve and types of valve. By the present invention it is possible to use the same valve body, suitably a forging, for both seatless and seat valves, and to effect the transformation from seatless type to seat type or vice versa simply by substitution of nozzles which are threaded and desirably also welded to the valve body. In the case of a tandem valve, in which two or more valves are placed in series, bores can be provided and either bore may be used as a seatless valve and the other as a seat valve, in accordance with the wishes of the user. It is also possible by substitution of nozzles to construct various types of seatless or seat valves from the same valve body. Where a seat valve is concerned the packing abutment or packing seat is secured to the nozzle, and also the guiding opening for the seatless valve member.

By this means, the variety of forged bodies which must be kept in stock is greatly reduced while at the same time making it possible to supply any desired type of valve on short notice.

Describing in illustration and not in limitation and referring to the drawings:

An important feature of the present invention is the manufacture of valves of different types by assembling valve-part units that I find recurrent in and/or characteristic of different types of valve, and which are themselves well adapted to quantity manufacture for stock and thereafter to quick easy selectively variant assembly into the valves of the desired different types,—as for the prompt filling of individual orders, that sometimes for a single order may include but a single valve and perhaps of a type used too seldom to warrant its maintenance in stock.

My variant valve-part units here include one or more bodies, herein designated B1 and B2, nozzles, herein designated N1 and N2, and valve mounts herein designated M1 and M2.

The bodies B1 and B2 have each one or more through bores 10 laterally enlarged along an intermediate portion of their length at 11 and ported into the enlargement at 12. In the body B1, this port 12 is a central connection between the intermediate enlargements of the through bores and in the body B2 it is connected directly by the flange 13 to the piping from outside the body.

The nozzles N1 and N2 selectively and interchangeably connect to the bodies B1 and B2 at one end of any of the through bores 10 and the corresponding valve mounts M1 and M2 connect selectively and interchangeably to the bodies at the other end of any such through bore 10. It will be understood that the nozzle N1 and valve mount M1 cooperate into a set for a given type valve, here a seatless type valve, and for assembly with either body at opposite ends of any through bore 10 thereof; and in the same way the nozzle N2 and valve mount M2 which are respectively interchangeable with the nozzle N1 and valve mount M1, are a set for use together at opposite ends of any through bore 10 of the bodies B1 and B2 to form a different type valve, here a hard-seat disc valve, and the bodies B1 and B2 are formed with the requisite characteristics for both types of valve.

Thus the lateral enlargements 11 along an intermediate portion of the bores 10 are needed with the seatless type valve for annular admission to the tubular valve member and are needed in a body for the other type valve from a manufacturing standpoint because it adapts the part to quantity manufacture by adapting the body to both types of valve. However, if desired, the lateral enlargement 11 need not be machined until it is decided that a bore is to be used for a seatless valve in which case it will not be present in a bore for a hard-seat valve.

As best seen in Figures 2 and 4, the nozzle N1 threads at 14 into the body B1 and if desired may be welded to place at 15. It is provided with an inward shoulder 16 to peripherally fit the tubular valve 17 and to support and carry the lower packing ring 18 of the valve.

The tubular valve 17 supported from the mount M1 opens downwardly into the nozzle and has lateral ports 19 adapted in raised position of the valve to register with ports 20 through a usual sleeve 21 into the enlargement 11 of the body interior. A usual upper packing ring 22 seals the valve from the body and is compressed downwardly upon the sleeve 21 by a follower 23 which supports the downward pressure of the mount M1, transmitted in known manner from bolts 24 through springs 25.

The nozzle N1 carries a flange 26 for connection to adjoining piping.

The seatless valve is opened and closed in known manner by a screw 27 positioned by a yoke 28 and moved by a hand wheel 29 and handle 30.

As best seen in Figures 1 and 3, the nozzle N2, interchangeable with the nozzle N1, may connect with the body in the same way, by threading at 14 and desirably welding at 15.

It carries a hard seat 31 desirably threaded at 32 into the nozzle and in position to cooperate with valve structure carried by the mount M2. This mount includes a base 33, packing gland 34, and an internally threaded nut 35 held by standards 36 that receives the externally threaded stem 37 of the valve. The stem 37 carries a hand wheel 38 and handle 39. The stem 37 makes swivel connection at 40 with a valve 41 adapted to cooperate with the seat 31 in the usual way. The nozzle N2 has a flange 42 for connection to adjoining piping.

The structure of Figures 1 and 2 shows a tandem valve arrangement that has been found particularly well suited for high-pressure "blow-off".

The through bores are laterally spaced from one another and relatively perpendicular (transverse). One receives the hard-seat valve units N2 and M2, and the other receives the seatless valve units N1 and M1. More usually the nozzle N2 is connected at its outer end to the high pressure source, the outlet of the tandem valve being from the nozzle N1.

If desired, two hard-seat or two seatless valves can be placed in the body B1. Figure 9 shows any nozzle N with any other nozzle N in the body B1, and Figures 7 and 8 show a suitably different form of body B2 with the respective nozzles N1 and N2.

It will be seen that, from the illustrated stock valve-part units B1 and B2, N1 and N2, M1 and M2, assembled valves of five different types may be quickly made, any one of which offers advantages with respect to and may in some cases be preferable to any of the others. These valves of five different types are respectively:—single seatless valves by assembling the members B2, N1 and M1; single hard-seat disc valves by assembling the members B2, N2 and M2; tandem hard-seat-seatless valves by assembling the members B1, N1, M1, N2 and M2; tandem seatless-seatless valves by assembling the members B1, N1, M1, N1 and M1; and tandem hard-seat-hard-seat disc valves by assembling the members B1, N2, M2, N2 and M2.

It will be evident that my invention makes it possible to construct desirable seatless or seat valves from suitable valve bodies by simply adding a selected seat or seats each consisting of a valve nozzle and valve with valve-operating mechanism. If the valve body has a single bore, a suitable set is obtained, and the nozzle of the seat is screwed into the threaded end of the bore while the valve and valve-operating mechanism are applied to the opposite end of the bore. If the valve body has several bores, this procedure is simply repeated for each bore, selecting the seats to produce the desired form of valve, whether it be a combination of seatless or seat valve, of two or more seatless valves of the same or different sizes, or of two or more seat valves of the same or different sizes. Change of size in the valve and its seat does not necessitate a change in the valve body, but merely substitution of nozzles, and cooperating valves and valve-operating mechanism. Where the change is merely in the hard-seat valve, for example, substitution may merely be made of a new seat and valve member without even changing the nozzle and valve-operating mechanism, within certain limits of size.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. A body for a tandem valve formed with a plurality of laterally spaced valve bores, one of which is laterally enlarged along an intermediate portion of its length and the body having a passage connecting the bores at the enlargement, the body formed at one end of each bore for an interchangeable connection respectively with a nozzle mounting a valve seat at its connection end, and with a nozzle mounting packing for a seatless valve and formed at the other end of each bore for an interchangeable connection respectively with a seat valve and a seatless valve.

2. A rectangular block of substantially square cross-section and longer than its width or thickness, bored parallel to the ends, the bores being at right angles to one another, operating mechanism for each bore attachable to one face of the block and carrying a valve and nozzles of different character entering within the opposite ends of the bore, rigidly secured therein and each carrying its own structure for cooperation with the valve structure carried by the corresponding operating mechanism.

3. A valve body having intercommunicating first and second bores perpendicular to each other, an outlet nozzle extending into the first bore, rigidly united to the body and including cooperating walls for a seatless type of valve for which the second bore forms an inlet, a valve and operating mechanism therefor secured to the body at the opposite end of the first bore, a valve seat for the second bore insertable at one end of the bore and a valve and operating mechanism for the second bore adapted to cooperate with the seat and secured to the body at the other end of the second bore from that at which the seat is insertable.

4. A valve block having two bores at right angles to each other, each passing completely through the block and communicating within the block to employ the first bore as an inlet to a valve in the second bore, removable valve seat means extending into the first bore on the inlet side of the communication with the second bore and rigidly united to the body, a removable valve cooperating therewith and closing the opposite end of the first bore, a nozzle extending into the body on the outlet side of the second bore, rigidly united to the body and forming a packing abutment, sleeve packing gland means for a seatless valve pressing against the abutment of the outlet nozzle, a seatless valve within the packing gland and removable combined valve-operating and gland-compressing means secured to the body in line with that end of the second bore opposite to the outlet nozzle.

5. A valve body having a first straight bore extended clear through the body from end to end, enlarged at an intermediate point and a transverse bore affording an inlet to the enlargement of the first bore, the first bore being counterbored, in combination with an outlet nozzle extending into the counterbore of the first bore, rigidly united to the body and carrying an annular abutment, a laterally ported packing sleeve engaging the walls of the first bore on either side of the enlarged portion, packing between the packing sleeve and said abutment at one end of the sleeve, packing within the first bore at the other end of the sleeve, a seatless valve engaging the inside of said sleeve and packing and extending down into the outlet nozzle, means for exerting pressure on the packing at the opposite end from the outlet nozzle, upon the sleeve and, through the sleeve, upon the packing at the outlet nozzle end, and attachment means for fastening the means for exerting pressure to the valve body in line with the valve.

6. A valve body having two straight bores, the second of which is enlarged at an interior position and a passage affording communication from the enlarged portion to an intermediate point on the first bore, each bore being counterbored at one end, outlet nozzles for the counterbored ends of the bores containing respectively a seat for a hard-seat valve and an abutment for the packing of a seatless valve, valves adapted to be inserted in the ends of the straight bores opposite to the counterbore and operating and sealing mechanism for said valves adapted to cooperate with the seat and seatless valve respectively.

7. The process of manufacturing a valve, which consists in making a valve body with a bore threaded and adapted to receive a valve at the first end and adapted to receive valve-operating mechanism at the second end, the bore being free from features which will interfere with the use of variant valves in the body, in making a plurality of sets of different valve nozzles and valves with valve-operating mechanisms, each adapted to be applied respectively to the first and second ends of the bore and in building up a valve from a selected set consisting of a cooperating valve nozzle, and valve with valve-operating mechanism in combination with the valve body.

8. A body for a tandem valve formed with a plurality of laterally spaced valve bores, one of which is laterally enlarged along an intermediate portion of its length and the body formed for an interchangeable connection respectively with a nozzle mounting a valve seat at its connection end and with a nozzle mounting packing for a seatless valve and formed at the other end of each bore for an interchangeable connection respectively with a valve seat and a seatless valve in combination with a nozzle mounting a valve seat and a nozzle mounting packing for a seatless valve, at one end each of the bores and with a seat valve and a seatless valve at the other end each of the bores.

DAVID ROBERT YARNALL.